United States Patent [19]

Newport et al.

[11] Patent Number: 4,544,834

[45] Date of Patent: Oct. 1, 1985

[54] MEMORY DEVICE

[75] Inventors: Derek J. Newport, Newcastle; Christopher Hood, Reading, both of England

[73] Assignee: Johnson Matthey Public Limited Company, London, England

[21] Appl. No.: 601,107

[22] Filed: Apr. 18, 1984

Related U.S. Application Data

[63] Continuation of Ser. No. 353,490, Mar. 2, 1982.

[30] Foreign Application Priority Data

Mar. 4, 1981 [GB] United Kingdom ................ 8106820

[51] Int. Cl.⁴ ............................................. G06K 19/01
[52] U.S. Cl. .................... 235/487; 235/375; 235/380
[58] Field of Search ................ 235/491, 487, 472, 462

[56] References Cited

U.S. PATENT DOCUMENTS

| | | | |
|---|---|---|---|
| 2,950,050 | 8/1960 | Mazer et al. | 235/491 |
| 3,647,279 | 3/1972 | Sharpless et al. | |
| 3,796,999 | 3/1974 | Kahn | 350/351 |
| 3,978,320 | 8/1976 | McBride, Jr. | 235/487 |
| 4,068,213 | 1/1978 | Nakamura et al. | 340/149 A |
| 4,240,712 | 12/1980 | Thirant | 350/351 |
| 4,298,793 | 11/1981 | Melis et al. | 235/487 |
| 4,396,997 | 8/1983 | Kahn et al. | |

OTHER PUBLICATIONS

"Electronic Display", *Matrix and Alphanumeric Devices*, pp. 232-235, 1979, Sol Sherr.

*Primary Examiner*—Gene Z. Rubinson
*Assistant Examiner*—Robert Lev
*Attorney, Agent, or Firm*—Cushman, Darby & Cushman

[57] ABSTRACT

A portable credit device for use in a credit control system has an electrochromic cell display, which contains a transition metal oxide that can color cathodically by reduction or anodically by oxidation. This enables a permanent, unpowered memory to be achieved. A credit control system is also disclosed in which the portable credit device can be used.

26 Claims, 1 Drawing Figure

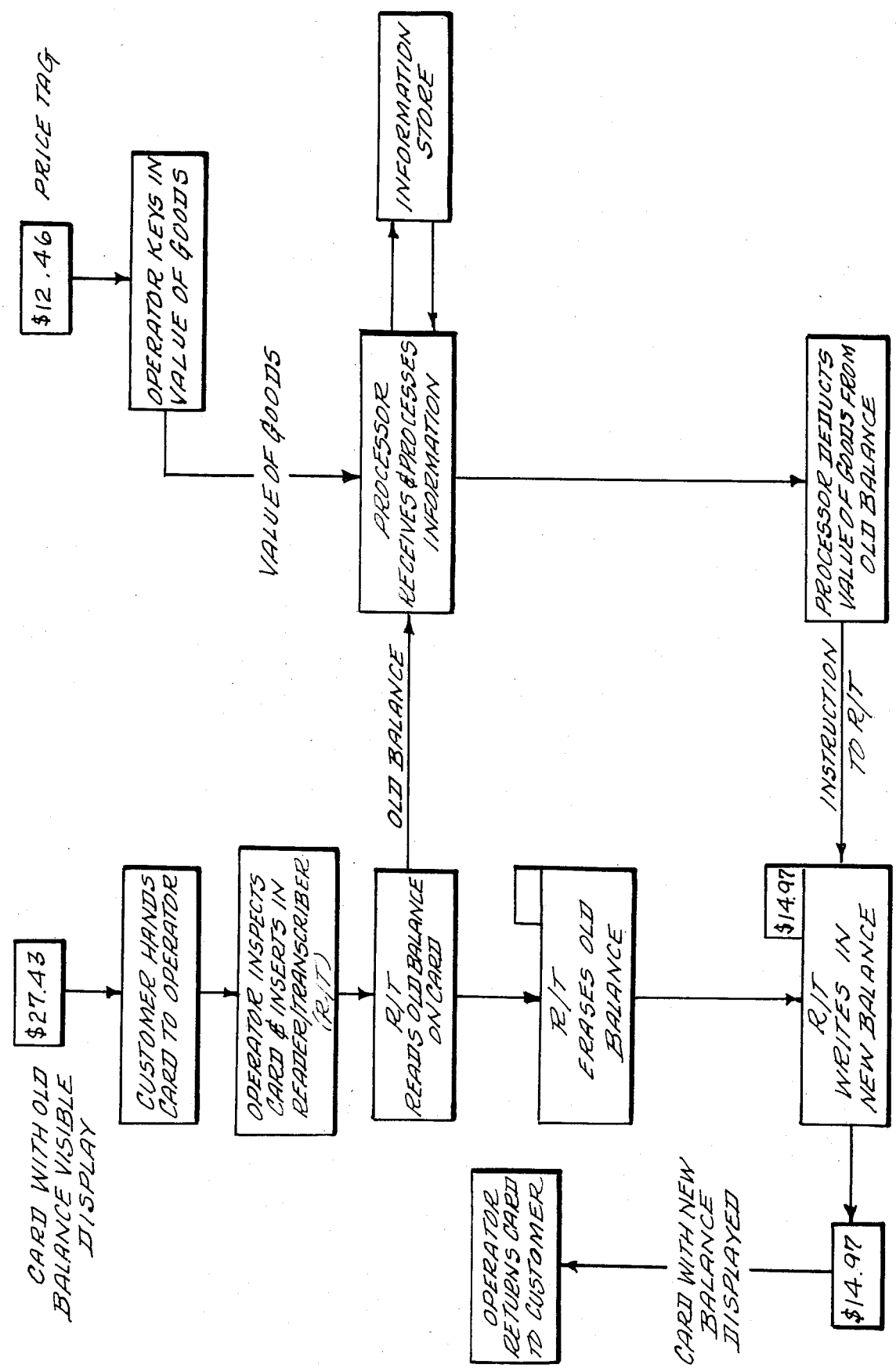

MEMORY DEVICE

This is a continuation of application Ser. No. 353,490, filed Mar. 2, 1982.

This invention relates to portable devices enabling a customer to acquire or to gain rapid access to goods and services, more particularly it relates to such devices in which information may be stored and in which the said information may be amended or updated.

Electronic methods of payment at the point of sale are known. For example, one known method allows customers to pay for petrol at six filling stations in the Norwich area using an electronic card reader which automatically records details, such as account number, stored on a magnetic stripe on one face of a credit card or bank card carried by the customer. The method automatically debits a customer's bank or credit card account, issues a receipt and, at the same time, the appropriate account file stored at the bank or credit organisation as well as the oil company's accounting centres for the filling station concerned are updated.

In this known method, however, it is necessary for the filling station attendant to take the card from the customer, pass it through a reader and the customer is required to sign a receipt verifying the sale. The attendant, is also required to verify the signature. The method thus uses an electronic transfer of account information but it is dependent upon the customer providing verifiable signature and having a credit account recognised by the sales organisation. Point of sale use of such a credit facility may thus lead to an unacceptable delay in operation, particularly when a number of people are waiting to be served. For example, in addition to the delay occasioned by a queue at a petrol filling station, rail users not infrequently experience delays occasioned by user of a credit card in the purchase of a railway ticket, and, even when a magnetic reader is used, such delays may cause the passenger or subsequent passengers to miss a train.

One object of the present invention is to enable a customer to gain immediate access to goods, currency or services and to debit the customer with the correct charge without delay, without the need for tendering currency notes and coins and without the need for change to be given. In the remainder of this specification "a point of transaction" is used to include the beginning or the end of a journey or any point where goods or services are normally paid for, or at a mechanical device such as cash dispensing machine and the term "goods" is used to include any tangible or intangible item of value including articles of manufacture, food, natural products, currency and access to transportation or to premises or areas otherwise restricted.

According to one aspect of the present invention a device comprises a conveniently portable unit, such as a card which has formed thereon a pattern comprising individual segments each of which can be activated by an externally applied signal to give a visible and persistent display of information which remains visible in the absence of the said signal and each of which can be deactivated to erase the said visible display also by means of an externally applied signal.

In a preferred embodiment of the invention the said device has electrical connections to each individual segment for applying the said external signals thereto and each individual segment of the pattern formed on the card comprises an electrochromic cell.

According to a second aspect, the invention also includes a control system comprising:
 (a) a card carrying information at least a part of which is visually displayed;
 (b) a reader unit for reading and transmitting the information carried by the card;
 (c) a processor for receiving the transferred information from the reader unit, processing the information received (optionally in conjunction with information stored by or available to the processor) and transmitting information resulting from the processing to
 (d) a transcriber unit which receives the transmitted information and correspondingly amends the information carried on the card.

Information is recorded on the card at least in part by means of a visual display and is capable of amendment or modification by an external signal applied by the transcriber unit and may be magnetic, electronic, optical chemical or electrochemical in nature. A combination of these methods of storage enables a parity check to be used in order to verify the information stored.

The reader unit may read the information carried by the card optically by means for optical character recognition, spectrophotometrically, or electrically by electrically sensing which segments of the pattern are activated and which are deactivated. Reading is preferably carried out by electrical sensing. Preferably also the reader unit (b) is physically combined with the transcriber unit (d) to form a single reader/transcriber unit. The card is placed in the reader/transcriber unit, it is read, the information is processed in the processor and the information carried by the card is then amended by applied signal from the transcribing part of the reader/transcriber unit.

The applied signal from the transcriber unit may be electrical, erasing the old information in appropriate segments by current reversal and inserting new information by activating (passage of current) other appropriate segments of the display. The applied signal may be magnetic and would insert new coded information on the magnetic stripe part of the card. The applied signal may be optical by means of a laser impinging directly into a liquid crystal cell to give an opaque or smectic form of the liquid crystal by heating or irradiation. With liquid crystal display (LCD) the applied signal may also be electric where the opacity of the liquid is sensitive to the electric field applied. In some forms the LCD may act as an unpowered memory until erasure by field reversal or by fading after a minimum period.

Other LCDs which may be used in this invention are described in U.S. Pat. Nos. 3,796,999 and 4,240,712. In U.S. Pat. No. 4,240,712 the device is activated by thermo-optically in a layer of material exhibiting a smectic mesophase. In U.S. Pat. No. 3,796,999 a liquid crystal device can be activated and erased by localised thermal heating utilizing for example an infrared laser.

The present invention may be used for carrying out or monitoring any financial transaction including recording a balance, purchase of goods or services, payment of accounts and recording stock or availability thereof. Information in connection with recording stock or availability thereof, would naturally be available to the processor (c) and, in such case, the card would be a stock card which is updated immediately any stock is sold.

The invention therefore includes a portable device (e.g. a card) enabling the holder to acquire goods comprises means providing a visual display of information (e.g. figures or symbols) indicating a value and means for electronic connection of the said display at a point of transaction with a reader/transcriber unit for processing of the information by the capacity to sense the value of the existing display and to replace it with a new display having a lower value such that the difference is equal to the value of the goods acquired.

The information may be in any readable form, for example, figures or symbols.

The reader/transcriber unit may comprise means for electronic connection to a portable device (a card) comprising a visual display in figures or symbols indicating a value, means for sensing the value of the display in a device connected to it, means for deducting the value of goods acquired by the holder of the portable device from the value indicated thereon and means for replacing the said visual display by a new display having a lower value such that the difference in value between the old and the new displays is equal to the value of the goods acquired.

Further design features in the devices according to the present invention may be included in their construction enabling them to perform in a more sophisticated manner. For example a magnetic strip may also be included providing a supplementary source of information for the reader/transcriber unit and a keying means may also be incorporated restricting access to only those devices having a key of the appropriate shape or size. Supplementary information could include a record of transactions or the most recent transactions thus enabling a processing error to be corrected.

The visible display in devices according to the present invention is provided for example by liquid crystal devices, light emitting diodes or electrochromic cells. Preferably but not essentially the device providing the visual information should have the ability to remain visible, visible coloured or opaque without this passage of a current. The colour or opacity is also preferably only removed by current reversal. Light emitting diodes which, of course, do not comply with this preferred requirement may still be used where it is acceptable for the portable unit to be powered. In the case of an electrochromic cell the established pattern and will not be erased without current reversal. The established pattern thus acts both as visual and electronic memories which do not require power for their maintenance. Thus they are preferred.

Cathodic coloration of electrochromic materials and electrochromic cells suitable for providing the visual displays which may be utilized in this invention are reviewed in "Displays" January 1982 pages 3–22. (Dautremont-Smith)

A passive thin film display based on the electrochemically reversible formation of a tungsten bronze according to the reaction:

$$WO_3 + xM^+ + xe^- \rightleftharpoons M_xWO_3 \qquad (I)$$

(colourless) (blue)

where $0<x<1$ is described in an article by Green, Smith and Weiner in "Thin Solid Films" Vol. 38 (1976) pps 89–100. A thin film of $WO_3$ may be part of a transparent sandwich in an electrochemical cell that can be coloured. e.g.

$$C_1-^{ve}M|M^+x^-|WO_3,-ITOC_2+^{ve}$$

$C_1$ and $C_2$ are metal contacts. ITO (indium-tin-oxide) is a transparent conducting material and $M^+x^-$ is an electrolyte with metal cations. Suitable cations are those of the alkali metals Li, Na and K, but others may be used.

The passage of a small amount of current through the $WO_3$ cathode causes it to become deep blue because of the formation of a tungsten bronze (see equation (I)) where $0<x<0.3$. The electrode remains blue on open circuit and is bleached (i.e. reaction (I) is reversed) on current reversal. In such a cell a standing voltage exists owing to the M activity difference and this may be detected externally. The information displayed visually may therefore also be sensed electrically by an electronic reader unit.

Alternatively, but less preferred optical character recognition or spectrophotometric measurement may be used to access the information displayed. As indicated current reversal removes the colour of the electrochromic display and removal of the colour (sometimes referred to as bleaching) may be measured or read by comparison against a standard or comparative electrochromic display cell. Such measurement may be achieved using spectrometer in conjunction with a photomultiplier. Where it is required to measure a particular wavelength of radiation, a monochromator may be used. Colour changes of the electrochromic display may also be detected by scanning techniques and by use of photocells.

If a white reflector is placed behind the transparent sandwich in the electrochromic cell described above, the perceived change in colour is blue to white. A letter in "Thin Solid Films" volume 40 (1977) L19-L21 describes a cell in which M-$\beta$ alumina is incorporated into the cell (where M is Li, Na or K):

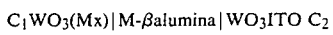

$$C_1WO_3(M_x)|M\text{-}\beta\text{alumina}|WO_3ITO\ C_2$$

Japanese patent publication No. 7909170 Jan. 23, 1979 (Application No. 77/73856 June 23, 1977) describes silver containing $\beta$-alumina in which $Ag^+$ are the colour inducing ions.

The present invention also includes a process for the purchase of goods comprising:
 (a) issuing to the customer in exchange for cash or credit a portable device (e.g. a card) as described herein into which device a nominal value is entered and is capable of display to the customer;
 (b) accepting said device from the customer at a point of transaction and processing same by use of a reader/transcriber unit according to the second aspect of the present invention; and
 (c) returning the said device to the customer with value of the display reduced by an amount equal to the value of the goods purchased.

At stage (b) acceptance of the said device from the customer may simply entail giving the customer direct access to the reader/transcriber unit. In the case of transportation by railway, road vehicle or airplane, for example, the device may need to be processed both at the start and the end of the journey. The first processing would insert information in the device regarding place of commencement of journey and the second processing would use the information to deduct the appropriate value. In another example the first processor would insert information as to time of commencement where payment is to be related to time of use of a service such as vehicle hire, car-parking, hotel accommodation and similar services.

The value displayed by the device according to the first aspect of the present invention may be alphanumeric or may be symbolic. Numerals may express a sum in any currency, e.g. pounds sterling or dollars, which may be arithmetically reduced in value by the reader/transcriber on purchase of further goods or symbols or letters may simply be erased by the reader/transcriber so that the device will expire when all symbols or letters in the display have been erased. The device will then be ready for recharging by the issuing authority in exchange for more credit or cash from the customer holding the device.

The device has the advantage of being directly readable by sales personnel or inspectors who can then immediately sanction its use as a credit instrument. A device whose value had been completely exhausted or reduced below the value of the goods to be acquired, or an out of date device, could be rejected by the reader/transcriber without further processing or if desired the reader/transcriber could enter and accept a certain overdrawn or negative value on the display. A rejection could be accompanied by visible or audible warning to the attendant if required.

The reader/transcriber units according to the present invention would normally incorporate programmable machine intelligence at the appropriate level for the degree of sophistication that its operation required.

The multiple connections of the normal seven bar symbol alpha-numeric visible display each need to be sensed by the reader/transcriber to enable the current value of the device to be read. The new value may then be inserted by applying potential to the terminals necessary and erasing the previous display where necessary by current reversal. A magnetic reader may also be incoporated as well as electronic sensing to detect more of the information held in the portable device for the time being connected to it.

Micro processing means would enable the reader/transcriber unit to be compact thus enabling several units to be positioned in a relatively restricted area. Reader/transcribers could be incorporated into automatic ticket gates currently in use by some transport authorities.

In yet a further embodiment the electrochromic display could duplicate information also contained in magnetic form in the device.

We claim:

1. A portable credit device for use in a service system, said device including a display, said display including a plurality of respective segments arranged in a pattern, each of said segments including:
    an electrochromic cell containing a solid electrolyte and a transition metal oxide which can colour cathodically by reduction or anodically by oxidation to store readable information, and
    electrical connecting means for applying an electrical signal of a first polarity to said cell to produce a visible persistent colour in said cell, said colour remaining visible in the absence of the said signal, for applying an electrical signal of a second polarity different from said first polarity to said cell to change the colour of said cell, and for connecting a standing voltage produced by said cell indicating the state of said cell.

2. A device according to claim 1 in which the transition metal oxide is selected from the group consisting of W, Mo, V, Nb, and Ti.

3. A device according to claim 1 in which the transition metal oxide is selected from the group consisting of oxides of Ir, Rh, Ni and Co.

4. A device according to claim 1 in which the cathodic colouration occurs by insertion of an cation selected from the group consisting of H, Li, Na, K and Ag.

5. A device according to claim 1 in which the information is entered or erased by means of an externally applied signal used to produce interruption of an electrical field.

6. A device according to claim 1 which is in the form of a card.

7. A credit control system comprising:
   (a) a portable credit device including a display, said display including a plurality of respective segments arranged in a pattern, each of said segments including: an electrochromic cell containing a solid electrolyte and a transition metal oxide which can colour cathodically by reduction or anodically by oxidation to store readable information, and electrical connecting means for applying an electrical signal of a first polarity to said cell to produce a visible persistent colour in said cell, said colour remaining visible in the absence of the said signal, for applying an electrical signal of a second polarity different from said first polarity to said cell to change the color of said cell, and for electrically connecting the standing voltage of said cell to a reader unit,
   (b) a reader unit for electrically reading and transmitting information carried by the portable credit device,
   (c) a processor for receiving the transmitted information from the reader unit, processing information received (optionally in conjunction with information available to the processor) and transmitting information resulting from the processing to
   (d) a transcriber unit which can receive the transmitted information and correspondingly amend at least some of the information stored by the portable credit device.

8. A control system according to claim 7 in which the reader unit operates by optical, spectrophotometric or electrical sensing means.

9. A control system according to claim 7 in which the reader unit and transcriber unit are combined into a single reader/transcriber unit.

10. A control system according to claim 7 in which the transcriber unit operates by optical, spectrophotometric on electrical means to amend information carried on the portable credit device.

11. A process for the credit purchase of goods comprising:
    (a) issuing to a customer in exchange for one of cash and credit a portable credit device including a display, said display including a plurality of respective segments arranged in a pattern, each of said segments including: an electrochromic cell containing a solid electrolyte and a transition metal oxide which can colour cathodically by reduction or anodically by oxidation to store readable information, and electrical connecting means for applying an electrical signal of a first polarity to said cell to produce a visible persistent colour in said cell, said colour remaining visible in the absence of the said signal, for applying an electrical signal of a second polarity different from said first polarity to said cell to change the color of said cell, and for electrically connecting to the standing voltage produced by said cell, wherein the information stored in said plurality of segments represents a value, (b) accepting said device from the customer at a point of transaction, (c) reading the information stored in said segments by sensing the standing voltages, produced by said cells and connected to the electrical connecting means of said segments, (d) transmitting the information read by said reading step (c), (e) receiving the information transmitted by said transmitting step (d), processing information received (optionally in conjunction with information available to the processor) and transmitting information resulting from the processing, (f) receiving the information transmitted by said transmitting step (e), (g) reducing the value represented by the information stored by said device in response to said received processed information by an amount equal to the value of goods purchased by the customer, and (h) returning the said device to the customer.

12. A portable credit device including:

display means for storing visual indicia of credit, said display means including a plurality of respective electrochromic cell means for selectively changing between a first and a second visual state in response to electrical signals, said state change persisting after said electrical signals are removed; and a plurality of respective electrical conductor means for conducting respective electrical signals to said plurality of electrochromic cell means to change the state of said plurality of cell means and for conducting a standing voltage produced by each of said cell means indicating the state of said each to electrically ascertain said indicia.

13. A credit control system comprising:

a portable credit device including:

display means for storing visual indicia of credit, said display means including a plurality of respective electrochromic cell means for selectively changing between a first and a second visually discernable state in response to electrical signals, said state change persisting after said electrical signals are removed, and a plurality of respective electrical conductor means, electrically connected to said cell means, for conducting electrical signals;

transcribing means, adapted to electrically connect to said plurality of electrically conductor means, for selectively applying electrical signals through said plurality of electrically conductor means to said plurality of electrochromic cell means to store said indicia; and reader means for sensing the state of each of said plurality of electrochromic cell means to ascertain said stored indicia.

14. A credit control system as in claim 13 wherein said reader means includes means for optically sensing the state of each of said plurality of electrochromic cell means.

15. A credit control system as in claim 14 wherein said optical sensing means includes means for recognizing patterns defined by different combinations of said cell means in said first state.

16. A credit control system as in claim 14 wherein:

ones of said cell means in said first state take on a first colour and ones of said cell means in said second state take on a second colour different from said first colour; and said optical sensing means includes means for sensing the colour of each of said plurality of cell means.

17. A credit control system as in claim 13 wherein said reader means includes means, adapted to electrically connect to said plurality of conductor means, for ascertaining the state of each of said plurality of cell means by sensing a standing voltage potential produced by said each cell means, said produced standing voltage being dependent upon which of said first and second states said each cell means is in.

18. A process for the credit purchase of goods comprising the steps of:

issuing to a customer, in exchange for monetary consideration, a portable credit device including:

display means for storing visual indicia of said monetary consideration, said display means including a plurality of respective electrochromic cell means for selectively changing between a first and a second visual state in response to electrical signals, said state change persisting after said electrical signals are removed; and a plurality of respective electrical conductor means for conducting respective electrical signals to said plurality of electrochromic cell means to change the state of said plurality of cell means and for conducting a standing voltage produced by each of said cell means indicating the state of said each to electrically ascertain said indicia, said indicia representative of the value of said consideration;

accepting said device from the customer at a point of transaction;

ascertaining said stored indicia by sensing the state of each of said plurality of electrochromic cell means;

subtracting, from said stored indicia, the value of goods purchased by the customer by selectively applying signals through said plurality of electrical conductor means to said plurality of electrochromic cell means; and returning said device to the customer.

19. A process as in claim 18 wherein said ascertaining step includes the step of optically sensing the state of each of said plurality of electrochromic cell means.

20. A process as in claim 19 wherein said optically sensing step includes the step of recognizing patterns defined by different combinations of said cell means in said first state.

21. A process as in claim 19 wherein said optically sensing step includes the step of sensing the colour of each of said plurality of cell means, the colour of each of said cell means indicative of the state of said each.

22. A process as in claim 18 wherein said ascertaining step includes the step of sensing the standing voltage produced by each of said plurality of cell means, said produced standing voltage being dependent upon which of said first and second states said each is in.

23. A process as in claim 22 wherein said electrical potential sensing step includes the step of electrically connecting to said plurality of conductor means of said device.

24. An information storage system comprising:

electrochromic cell means for selectively changing between a first and a second state in response to an electrical signal applied thereto, said state change persisting after said electrical signal is removed, said electrochromic cell means comprising a material which changes state cathodically by reduction or anodically by oxidation, said cell means producing a standing voltage when in said first state; and interfacing means for determining the state of said cell means by measuring the electrical potential produced by said cell means.

25. A system as in claim 24 wherein said interfacing means also selectively changes the state of said cell means and includes:

means for electrically connecting to said cell means;

means, connected to said electrically connecting means, for sensing the voltage produced by said cell; and means, connected to said electrically connecting means, for selectively applying an electrical signal to said cell means.

26. A system as in claim 24 wherein said cell means assumes a first color when in said first state and assumes a second color visually distinguishable from said first color when in said second state.

* * * * *